United States Patent
Dunkelberg

(10) Patent No.: US 11,412,891 B2
(45) Date of Patent: Aug. 16, 2022

(54) COFFEE GRINDER

(71) Applicant: Hemro International AG, Bachenbülach (CH)

(72) Inventor: Oliver Dunkelberg, Willerzell (CH)

(73) Assignee: Hemro International AG, Bachenbülach (CH)

(*) Notice: Subject to any disclaimer, the term of this patent is extended or adjusted under 35 U.S.C. 154(b) by 125 days.

(21) Appl. No.: 17/066,968

(22) Filed: Oct. 9, 2020

(65) Prior Publication Data

US 2021/0106177 A1    Apr. 15, 2021

(30) Foreign Application Priority Data

Oct. 10, 2019 (EP) .................................. 19202351

(51) Int. Cl.
| | |
|---|---|
| *A47J 42/06* | (2006.01) |
| *A47J 42/50* | (2006.01) |
| *A47J 42/56* | (2006.01) |
| *A47J 42/44* | (2006.01) |
| *A47J 42/18* | (2006.01) |
| *A47J 42/38* | (2006.01) |

(Continued)

(52) U.S. Cl.
CPC .............. *A47J 42/06* (2013.01); *A47J 42/50* (2013.01); *A47J 42/56* (2013.01); *A47J 42/44* (2013.01)

(58) Field of Classification Search
CPC .. A47J 42/06; A47J 42/50; A47J 42/56; A47J 42/44; A47J 42/38; A47J 42/16; A47J 42/36; A47J 42/40; A47J 42/18; A47J 42/08
See application file for complete search history.

(56) References Cited

U.S. PATENT DOCUMENTS

| | | | |
|---|---|---|---|
| 4,037,798 A | * | 7/1977 | Schnitzer ................ A47J 42/16 241/246 |
| 4,502,643 A | * | 3/1985 | Burggrabe ................ B02C 7/13 241/261.3 |

(Continued)

FOREIGN PATENT DOCUMENTS

| | | |
|---|---|---|
| WO | 2018/185570 A1 | 10/2018 |
| WO | 2019/122397 A1 | 6/2019 |

OTHER PUBLICATIONS

European Search Report for corresponding ER 19 20 2351, dated Mar. 17, 2020.

*Primary Examiner* — Jessica Cahill
*Assistant Examiner* — Mohammed S. Alawadi
(74) *Attorney, Agent, or Firm* — Sughrue Mion, PLLC

(57) ABSTRACT

Coffee grinder for grinding coffee beans, comprising a container or supply element for coffee beans and a grinding device for grinding the coffee beans. The grinding device comprises a first and a second grinding element between which the coffee beans are ground, the distance between the two grinding elements in the grinding process determining the degree of grinding of the ground coffee, and at least one grinding element being driven by a motor. An adjusting element is provided, with which the distance between the two grinding elements can be adjusted by rotating an adjusting element, and a magnetic rotational position sensor, which directly or indirectly determines the absolute rotational position of this adjusting element as a measure of the distance and provides it for the further control of the coffee grinder.

26 Claims, 2 Drawing Sheets

(51) Int. Cl.
*A47J 42/08* (2006.01)
*A47J 42/16* (2006.01)
*A47J 42/36* (2006.01)
*A47J 42/46* (2006.01)

(56) References Cited

U.S. PATENT DOCUMENTS

| | | | | |
|---|---|---|---|---|
| 4,685,624 | A * | 8/1987 | Nidiffer | A47J 42/40 |
| | | | | 241/37.5 |
| 4,955,510 | A * | 9/1990 | Newnan | A47J 31/42 |
| | | | | 221/268 |
| 5,564,636 | A * | 10/1996 | Mock | A47J 42/16 |
| | | | | 241/286 |
| 6,149,084 | A * | 11/2000 | Karg | A47J 42/50 |
| | | | | 241/257.1 |
| 9,427,110 | B2 | 8/2016 | Hoare et al. | |
| 10,413,127 | B1 * | 9/2019 | Jana | A47J 42/38 |
| 2010/0198413 | A1 * | 8/2010 | De' Longhi | A47J 31/42 |
| | | | | 700/275 |
| 2012/0138721 | A1 * | 6/2012 | Hergesell | A47J 31/42 |
| | | | | 241/277 |
| 2012/0228418 | A1 * | 9/2012 | Mazzer | A47J 42/18 |
| | | | | 241/290 |
| 2013/0001339 | A1 * | 1/2013 | Hoare | A47J 42/44 |
| | | | | 241/101.3 |
| 2013/0153698 | A1 * | 6/2013 | Zhang | A47J 42/40 |
| | | | | 241/169.1 |
| 2014/0361107 | A1 * | 12/2014 | Steiner | A47J 31/42 |
| | | | | 241/253 |
| 2016/0015214 | A1 * | 1/2016 | Lægdsgaard | A47J 42/10 |
| | | | | 241/257.1 |
| 2017/0354296 | A1 * | 12/2017 | Llopis | B02C 7/14 |
| 2018/0110369 | A1 * | 4/2018 | Piras | A23F 5/08 |
| 2019/0254464 | A1 | 8/2019 | Oddera | |
| 2019/0365155 | A1 * | 12/2019 | Mazzer | A47J 42/18 |
| 2020/0187706 | A1 * | 6/2020 | Rossetto | A47J 31/42 |
| 2021/0219781 | A1 * | 7/2021 | Abo | A47J 42/08 |
| 2021/0219782 | A1 * | 7/2021 | Jebb | A47J 42/18 |

* cited by examiner

FIG. 1

COFFEE GRINDER

TECHNICAL FIELD

The present invention relates to a coffee grinder and a method for operating a coffee grinder and uses of such a coffee grinder.

PRIOR ART

Coffee grinders are devices with which roasted coffee beans are processed into ground coffee. Whereas in the past, a large part of the coffee was ground by distributors and then used in ground form by the end customer, be it in the private or commercial sector, customer requirements have now shifted even further, because only freshly ground coffee allows really good coffee to be made. Accordingly, coffee grinders are increasingly being used by end customers, not only in coffee bars, but also increasingly in restaurants and similar establishments, some of which are even private.

The quality of brewed coffee now also depends to a large extent on the quality of this grinding, because only a coffee with the appropriate grinding degree is really suitable for a particular brewing process or type of machine. The grinding degree setting is therefore crucial for a coffee grinder. Until now, the grinding degree has usually been set manually using a handwheel or adjusting ring on the outside of the housing. The problem is that this setting is too imprecise and, in particular, becomes unreliable over time due to the play of the mechanical implementation and in some cases even systematic deviations are built up successively.

This is where the present invention comes into play.

SUMMARY OF THE INVENTION

Accordingly, one of the tasks of the present invention is to provide a coffee grinder which allows a more reliable adjustment of the grinding degree, yet is simple and robust in design.

The object of the present invention is a coffee grinder for grinding coffee beans to ground coffee with at least one container or a feed element for coffee beans and at least one grinding device for grinding the coffee beans. The grinding device comprises at least a first and a second grinding element between which the coffee beans are ground by relative rotation of the two grinding elements, the distance between the two grinding elements in the grinding process determining the degree of grinding of the ground coffee. At least one grinding element is usually driven by a motor.

The coffee grinder according to the invention is in particular characterized in that an adjusting element is provided, with which the distance between the two grinding elements can be adjusted by rotating an adjusting element, and that a magnetic rotation position sensor is provided, which determines the absolute rotation position of this adjusting element as a measure of the distance unambiguously directly or indirectly and makes it available for the further control of the coffee grinder.

The absolute rotational position is a unambiguously determined rotational position. This means that where the magnetic rotation position sensor is stationary, the component rotating in front of this rotation position sensor with a bipolar magnet embedded in it will undergo a rotation of less than 360° within the maximum adjustment of the distance in the machine.

It has been shown that such a magnetic rotation position sensor provides an unexpectedly simple and, in connection with such a coffee grinder, unexpectedly stable possibility of measuring the distance between the grinding elements. The conditions in such a coffee grinder are difficult because the motor generates a strong stray field and because the extreme vibrations of the grinder and the motor make it impossible to use a large number of common other sensors in practice. Surprisingly, a magnetic rotary position sensor can perform this task very reliably.

According to a first preferred embodiment, such a coffee grinder is characterized in that a first grinding element, preferably in the form of a grinding ring, grinding cone or grinding disc, is provided in a stationary position and a second grinding element, preferably in the form of a grinding ring, grinding cone or grinding disc, is rotatably mounted and rotates in the grinding process relative to the first grinding element, and that the second grinding element is connected in a shaft and is driven by the motor via this shaft. It is now either possible to adjust the axial position of the first or the second grinding element in such a device by means of the adjusting element.

More preferably, the grinding element driven by the motor is adjusted by the adjusting element. Correspondingly, according to another preferred design, the coffee grinder is designed in such a way that the shaft is supported in at least one bearing element, preferably at least one bearing ring, and at least one of these bearing elements is displaceably mounted and the shaft is axially coupled in this bearing element so that displacement of the bearing element in the axial direction causes a corresponding displacement of the shaft in the same axial direction. Now the adjusting element is preferably designed in the form of an adjusting pin and is coupled to the bearing element coupled in this way to the axial shaft position, the adjusting pin being mounted in such a way that rotation of the adjusting pin leads to simultaneous axial displacement of the bearing element.

The bearing element is preferably a bearing bush that guides the motor shaft and does not rotate itself. The bearing bush preferably also has a conical bore, preferably in a direction perpendicular to the axis of the shaft, in which the cone of the adjusting pin engages. The motor shaft is preferably preloaded at the lower end, i.e. at the end opposite the grinding housing with the grinding elements, typically on the side of the motor facing away from the grinding housing, by a spring in the direction away from the grinding housing. In the bearing bush there is preferably a bearing whose outer bearing ring accommodates the motor shaft (e.g. at a step of the motor shaft where the motor shaft tapers in the direction of the grinding housing), whereby the motor shaft is secured against axial displacement via the inner bearing ring of this bearing with a fastening means (e.g. with an axial screw) through the running disk flange (which running disk flange holds the rotating grinding element), The adjusting pin can preferably be mounted via a thread (it can, for example, have an external thread and run in a bearing shell with an internal thread) and it can engage with its tip in a bushing in or on the bearing element. In this case, an axial displacement of the adjusting pin causes the axial displacement of the bearing element. The tip of the adjusting pin is preferably conically tapered in such a design, and the slotted guide is in the form of at least one corresponding inclined flank, preferably in a recess in the bearing element.

Furthermore, the actuating element, preferably in the form of an adjusting pin, can be mechanically coupled to an adjusting element, preferably in the form of an adjusting ring, to be manually operated by the user, and the magnetic rotational position sensor can measure the rotational position of the actuating element directly on the actuating element or on a further component firmly connected to it. Alternatively, it is possible to measure indirectly at a rotating element mechanically coupled to the actuator, which is different from the user's adjusting element, whose rotation is coupled to the rotation of the actuator and which itself performs a maximum rotation of less than 360° within the adjustment range.

In any case, the element at which the rotational position is measured by the magnetic sensor is preferably different from the user's adjustment element.

According to another preferred embodiment, the actuating element in the form of an adjustment pin is mechanically coupled to an adjustment element that is manually operated by the user, for example in the form of an adjustment ring, and the magnetic rotational position sensor measures the rotational position of the actuating element directly on the adjustment pin or on another component that is firmly connected to it, in that a bipolar magnet is arranged on the axis of the adjusting pin with poles in radial direction (preferably on the side of the head end facing away from the bearing element), and the rotation position sensor is arranged axially above the bipolar magnet. It can be seen that the differences in the distance between the stationary magnetic rotation position sensor and the magnet arranged on the rotating part, which are caused by this construction, are so small that they do not influence the measuring accuracy of the sensor.

The adjusting element can preferably be mechanically coupled in the form of an adjusting pin to an adjusting element in the form of an adjusting ring to be manually operated by the user, and the magnetic rotational position sensor can indirectly measure the rotational position on a rotating element which is mechanically coupled to the adjusting element, is different from the adjusting element for the user and whose rotation is coupled to the rotation of the adjusting element and within the adjustment range in turn performs a maximum rotation of less than 360°. The ratios of the rotation of the rotary element to the rotation of the adjustment pin are in the range of 1.5:1-1:1.5, preferably in the range of 1.1:1-1:1.1, in particular in the range of 1:1. Preferably, no more than two transmission stages are provided between the adjustment pin and the rotary element.

A further preferred embodiment of the coffee grinder proposed here is characterized in that a gear wheel is arranged on the adjusting pin, which is coupled via an external toothing to a transmission gear wheel with external toothing (preferably the gear wheel and the transmission gear wheel having substantially the same diameter), and the bipolar magnet is provided or embedded in the transmission gear wheel on its axis or the transmission gear wheel via a further transmission stage, either a further gear wheel or a belt construction, is coupled to an additional rotary element, the rotation of which is thus also coupled to the rotation of the actuating element and performs a maximum rotation of less than 360° within the adjustment range, and the bipolar magnet is provided or embedded in this additional rotary element on its axis.

The coffee grinder may additionally have a weighing cell for measuring the weight of the ground coffee effectively inserted into a filter holder, this weighing cell being preferably located in a foot of the coffee grinder located outside the housing.

The coffee grinder preferably has an additional display, and the absolute rotational position from the magnetic rotational position sensor is further preferably transmitted to a central control system, and this control system correlates the absolute rotational position with the distance in terms of the gap width between the grinding elements and processes this information for output on the display or for further control or regulation.

For example, the display shows the actual value of the rotational position or the gap width and the target value required for the desired grinding degree, and/or an instruction to manually change a setting element manually operated by the user in a certain direction until the target value is reached. Preferably, additional optical and/or acoustic and/or mechanical feedback elements are provided to indicate to the user whether the target value has been reached.

However, there may also be a drive (e.g. small electric motor) which, based on the measurement of the absolute rotational position of the adjusting element in a controlled manner, automatically brings the adjusting element into the rotational position corresponding to a grinding degree selected and/or automatically determined by the user, if necessary in combination with measured values from an additionally provided measuring cell the weight measurement of the ground coffee.

Furthermore, the present invention relates to a method for operating a coffee grinder as described above. The proposed method is in particular characterized in that the coffee grinder comprises at least one display on which the actual value of the rotational position or the gap width and the target value required for the desired degree of grinding is shown, and/or at least one instruction to manually change a setting element to be manually operated by the user in a certain direction until the target value is reached. This indication is preferably dynamically changed while the user manipulates the adjustment element until the desired target value is reached, and further preferably additional optical and/or acoustic and/or mechanical feedback elements may be provided to indicate to the user whether the target value has been reached.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIG. 1 shows a coffee grinder in schematic views according to a first embodiment, where in a) a schematic side view is shown, in b) a view of the sensor arrangement and in c) a side view of the sensor arrangement;

DESCRIPTION OF PREFERRED EMBODIMENTS

Figure 1:
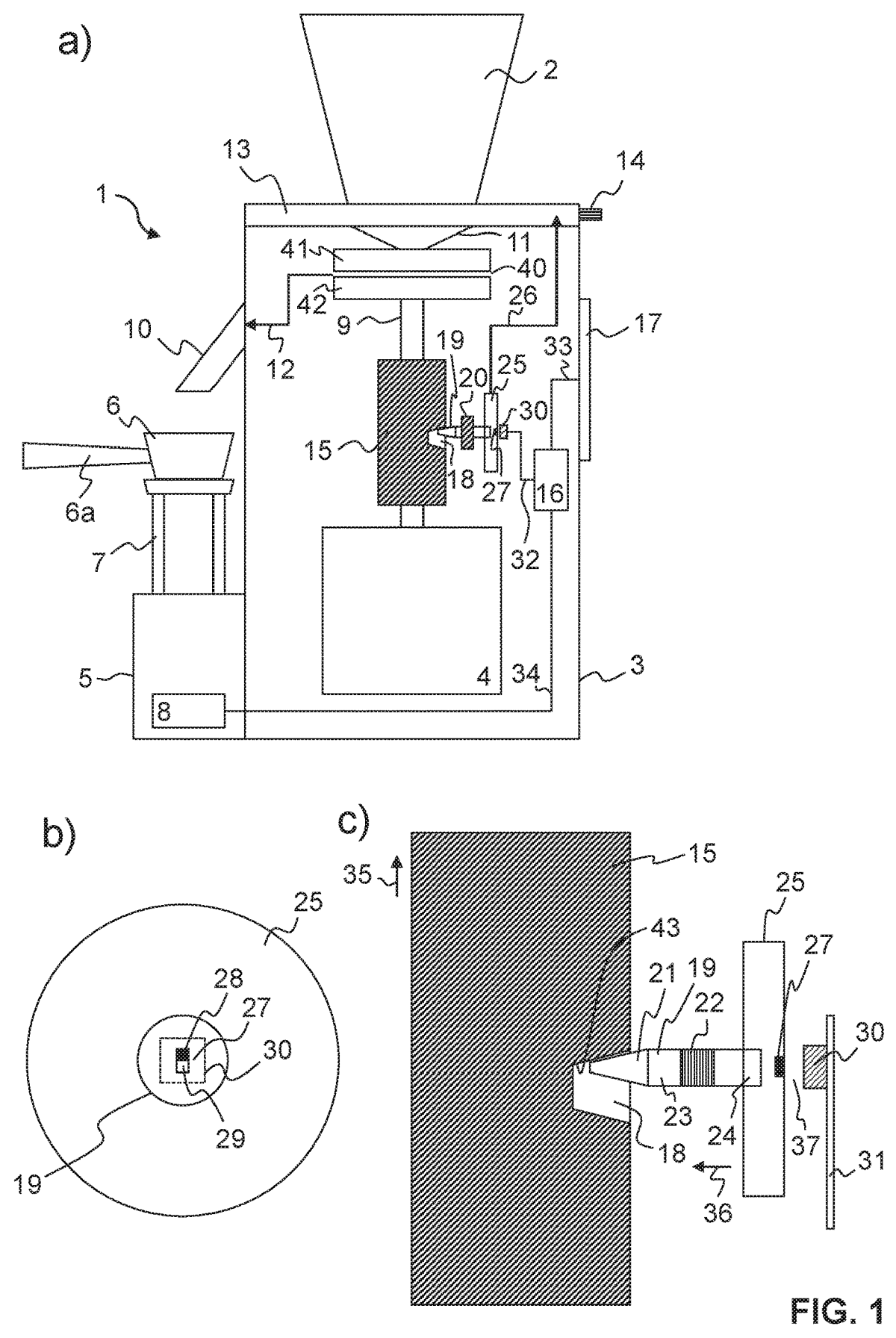
Figure 2:
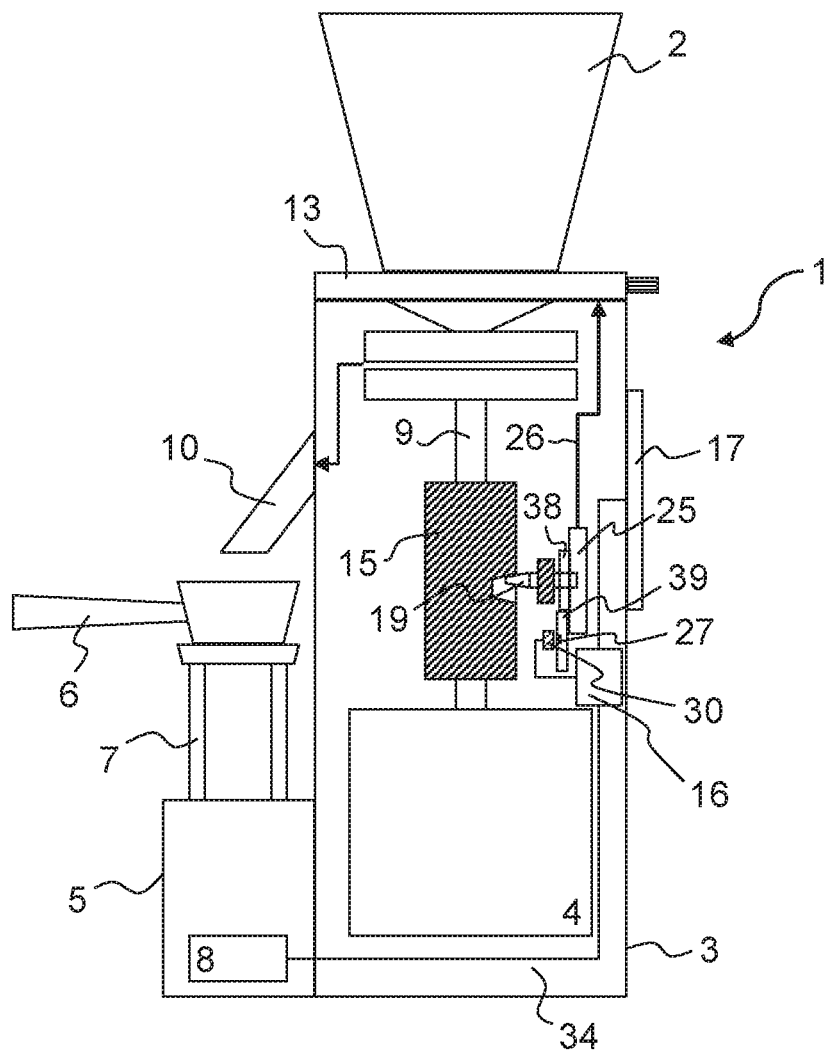
FIG. 2 shows a coffee grinder in a schematic side view according to a second embodiment.

FIG. 1a shows a schematic representation of a coffee grinder 1 with built-in sensors. It is basically a standard coffee machine with the following elements: In a housing 3, two grinding rings 41 and 42 with vertical axis of rotation are arranged in the upper part. Usually the upper grinding ring 41 is stationary and is loaded with beans from above via a hopper 2, which is located above the housing and filled with beans. Very schematically shown here, there is a grinding gap 40 between the two grinding rings 41 and 42 in which the beans are ground down to the desired size between the contours of the two rings. The required grinding degree depends on the desired type of coffee, etc. and the grinding degree is set by the width of the grinding gap 40. This will be discussed again later.

The ground coffee is then fed radially or even axially out of the grinding gap 40 via a supply line 12 shown schematically, and directed to an outlet 10. Through this outlet 10, the coffee usually falls by gravity into a filter holder 6, this filter holder 6 typically has a handle 6a and is designed to be docked with a bayonet lock on the underside of a coffee or espresso machine for the actual brewing process.

In the design example shown here, the filter holder 6 stands on a filter carrier 7, which is placed on a foot 5 of the coffee grinder. Alternatively, it is possible that such a filter carrier protrudes horizontally from the housing 3 and holds the filter holder for filling in a quasi fork shape.

In the example shown here, there is a weighing cell 8 in the foot 5 mentioned for measuring the weight of the coffee filled into the filter holder 6. Such a weight measurement is known per se and can be used to ensure a better and more consistent quality of the brewed coffee. The required weight can be set individually depending on the desired settings or the desired coffee.

In the example shown here, the two grinding rings 41/42 are both arranged with their axis vertical, the upper grinding ring 41 is stationary and the lower grinding ring 42 is rotatably mounted. The lower grinding ring 42 is driven by a motor 4, which is located in the lower part of the housing and which is shown here schematically. This motor drives a shaft 9, which is firmly connected to the lower grinding ring 42, and is mounted in at least one bearing ring 15. The axial position of the shaft 9 and thus also of the lower grinding ring 42 is determined by the axial position of this bearing ring 15. If the bearing ring 15 is pushed upwards accordingly, the width of the grinding gap 40 is reduced. In this case, the motor 4 itself can either be moved along or it is also possible that the shaft 9 is mounted in the motor so that it can be moved slightly in the axial direction over the required range.

As mentioned above, the degree of grinding is decisive for the desired coffee. For this reason, a mechanism is provided with which this grinding degree can be individually adjusted for each grinding cycle according to the requirements.

For this purpose, there is a conical recess 18 in the bearing ring 15 in the example shown here with an inclined flank 43 facing the grinding rings, as shown in FIG. 1c. An adjustment pin 19, which is horizontally mounted in a bearing 20, engages in the conical recess 18. The adjusting pin 19 has an external thread 22 which runs in a corresponding internal thread in bearing 20. In addition, the adjusting pin 19 has a conically tapered tip 21 corresponding to the inclined flank 43. On the side facing away from the tip 21, the adjusting pin 19 in the design example shown here has a square section 24, which in turn engages axially in a gearwheel 25. There is a corresponding square recess in this injection molded part 25, and the gear wheel 25 has a toothing on the circumferential periphery.

The grinding gap 40 is now adjusted purely mechanically in such a way that this gearwheel 25 is coupled to an adjusting ring 13 in the cover area of the housing 3 via a mechanical coupling 26 with multiple gear ratios, as shown schematically in the figures. There, there is usually a grinding degree scale on the housing and, for example, a vane 14 intended for manipulation, and if the vane 14 is brought to a certain scale position on this adjustment ring 13 or adjustment cover on this vane 14 by rotating the ring, then not only the cover but also the gearwheel 25 rotates through the mechanical coupling 26. By rotating this gearwheel 25, the adjustment pin 19 is pushed axially to the left deeper into the conical recess 18 via the thread 22 in the bearing 20 to narrow the grinding gap 40 in the reproduction shown in FIG. 1. The tapered tip 21 glides on the inclined flank 43 and moves the bearing ring 15 upwards in a controlled manner. This closes the grinding gap 40.

In order to open the grinding gap again, the adjustment ring 13 is turned in the opposite direction and the grinding gap opens again due to the force of weight or under the effect of a return spring on the motor shaft. A return spring is not absolutely necessary for this, because the weight of motor 4, shaft 9 and bearing ring 15 is usually so great that no separate return force is required to open the grinding gap 40, but it can be provided for safety reasons.

The main problem with such designs is that the mechanical coupling via the gearwheel 25 and the mechanical coupling chain 26 to the adjustment ring 13 naturally has considerable play and, especially over an extended period of use, is increasingly prone to offsets and play. This reduces the grinding accuracy required for reliable coffee to an unacceptable degree.

According to the invention, a magnetic sensor is now provided directly on the actual axial adjustment mechanism, which determines the gap width 40. A magnet 27 is inserted or placed axially in the gearwheel 25 on the side facing away from the adjustment pin 19. The north and south poles are arranged on different radial sides, and a magnetic sensor 30 is provided in a stationary position quasi above it. The magnetic sensor 30 is a programmable magnetic 360° angle sensor for contactless high-resolution angular position measurement and is typically based on magnetic Circular Vertical Hall (CVH) technology. It is an IC, which preferably has a high angular refresh rate in the range of 25-3200 microseconds, and its zero position can be calibrated.

Preferably diametrically magnetized disc magnets are used as magnets 27, Such sensors are essentially independent of the gap width 37 between the measuring surface of the magnetic sensor 30 facing the magnet 27 and the actual magnet 27, i.e. the gap 37 has no significant influence within the relevant dimensions of a maximum axial displacement of 1.5 mm of the gearwheel 25 over the entire adjustment range of the grinding gap.

For example, the sensor is a sensor of the type available from Allegro Microsystems under the designation A1330.

The error tolerance of such a sensor is typically in the range of 1.5° maximum, normally in the range of +/−0.4 to +/−1.1°. This results in a very high accuracy of the measurement for the freeness, as a rotation of less than 360° is converted via thread 22 to a translation in the axial direction of the bearing ring 15 of typically 1-2 mm. Accordingly, thread 22 is a fine thread with a pitch of 2 mm.

As can be seen in a top view according to FIG. 1b, the sensor 30 (shown here schematically as a dotted line) is arranged as symmetrically as possible axially on magnet 27, and these two elements are arranged coaxially with the circumference of the adjusting pin 19 and the gear wheel 25, which is shown here schematically. If the gearwheel 25 is rotated by manipulating the adjusting ring 13, as indicated by arrows 35 and 36 in FIG. 1, the adjusting pin 19 is pushed further into the conical recess 18 and the bearing ring 15 is moved upwards in the direction indicated by arrow 35, narrowing the grinding gap 40 by sliding flank 21 on flank 43.

The signal of the magnetic sensor 30 is transmitted via a data line 32 to a central control 16. If the material to be ground is also weighed, this central control 16 can also receive the data from the load cell 8 via a corresponding additional data line 34. The central control 16, which is supplied with power via a corresponding main supply line, which also feeds the motor and is not shown here, then controls a display 17.

This display 17 shows the user, among other things, in which absolute splitting position he is currently in. The user can, for example, set the desired grinding degree on this display, and is then given instructions in which direction to turn the adjustment pin in order to set the grinding degree to the desired value. This can be done, for example, by displaying the set value and the actual value measured by sensor 30 next to each other on the display and giving the user acoustic and/or visual feedback if these two values are the same after adjustment over paddle 14.

Automatic calibration can be achieved by automatically setting the value to zero when the stop is reached, or by asking the user to initiate a calibration routine when the stop is reached.

An alternative construction method when space is limited is shown in the example in FIG. 2. Here it is not possible to position the magnetic sensor 30 directly on the side of the gearwheel 25 facing away from the adjustment pin 19. In such a situation, e.g. because of a narrower housing, it is then possible to place another gear wheel 38 on the side of the gear wheel 25 facing the adjustment pin and to connect this to a transmission gear wheel 39. This gearwheel now has an axial recess in which the magnet 27 described above is inserted, and the magnetic sensor is now assigned on the side of the bearing ring 15.

Instead of the gear wheel, a transmission belt can also be used. Furthermore, it is possible to provide a further belt transmission up to the actual rotary element as a carrier for magnet 27 in addition to the two gear wheels 38 and 39 shown here. However, there should not be more than two such transmissions.

Alternatively, it is possible to dispense with such an additional transmission gear 39 and an attached gear 38 and to connect another gear directly to gear 25. However, care must be taken to keep the rotation conditions under control. There should be no rotation of more than 360° for the sensor, otherwise the magnetic sensor 30 is no longer in a defined state after one period of rotation. For this reason, solutions are preferred in which a 1:1 transmission ratio via two gearwheels 38 or 39 as shown here is coupled as directly as possible to the adjusting pin or otherwise, in the case of direct coupling to the toothing of gearwheel 25, one has to live with the fact that another gearwheel in the sense of gearwheel 39 that directly engages 25 must have a relatively large radius in the area of the radius of gearwheel 25.

LIST OF REFERENCE SIGNS

| | |
|---|---|
| 1 | coffee grinder |
| 2 | hopper for beans |
| 3 | housing |
| 4 | motor |
| 5 | foot |
| 6 | filter holder |
| 6a | handle of 6 |
| 7 | filter holder |
| 8 | weighing cell for weight measurement |
| 9 | shaft |
| 10 | outlet |
| 11 | feed |
| 12 | ground material supply line |
| 13 | adjustment ring |
| 14 | wings |
| 15 | bearing ring |
| 16 | central control |
| 17 | display |
| 18 | conical recess in 15 |
| 19 | adjustment pin |
| 20 | bearing for adjustment pin |
| 21 | tapered tip of 19 |
| 22 | threads from 19 |
| 23 | cylindrical section of 19 |
| 24 | square section of 19 |
| 25 | gear wheel |
| 26 | mechanical coupling from 25 to 13 |
| 27 | magnet |
| 28 | north pole of 27 |
| 29 | south pole of 27 |
| 30 | magnetic sensor |
| 31 | carrier for 30 |
| 32 | connection between 16 and 30 |
| 33 | connection between 16 and 17 |
| 34 | connection between 8 and 16 |
| 35 | displacement direction of 15 |
| 36 | displacement direction of 19 |
| 37 | distance between sensor front and 27 |
| 38 | mounted gear wheel |
| 39 | transmission gear wheel |
| 40 | grinding gap |
| 41 | upper grinding ring |
| 42 | lower grinding ring |
| 43 | sloping edge at 18 |

The invention claimed is:

1. A coffee grinder for grinding coffee beans into ground coffee, comprising at least one container or supply element for coffee beans and at least one grinding device for grinding the coffee beans,
   wherein the grinding device comprises at least a first and a second grinding element, between which the coffee beans are ground by relative rotation of the two grinding elements, wherein the distance of the two grinding elements in the grinding process determines the degree of grinding of the ground coffee, and wherein at least one grinding element is driven by a motor,
   wherein an adjusting mechanism is provided with which the distance between the two grinding elements can be adjusted by rotating an adjusting element,
   wherein a magnetic rotational position sensor is provided, which determines the absolute rotational position of the adjusting element unambiguously directly or indirectly as a measure of the distance and makes it available for the further control of the coffee grinder,
   wherein the second grinding element is rotatably mounted and rotates relative to the first grinding element during the grinding process, and the second grinding element is connected to a shaft that defines an axial direction and is driven by the motor via the shaft,
   wherein the shaft is supported in at least one bearing element,
   wherein a moveable structure that is disposed along the axial direction is displaceable in the axial direction,
   wherein the adjusting mechanism comprises an adjusting pin that is mounted via a thread and engages with its tip in a guide in or on the moveable structure and an axial displacement of the adjusting pin causes the axial displacement of the moveable structure,
   wherein the tip is formed conically tapering, and
   wherein the guide is formed as at least one inclined flank, in a recess of the moveable structure.

2. The coffee grinder according to claim 1, wherein the moveable structure is at least one bearing element.

3. The coffee grinder according to claim 2, wherein the at least one bearing elements is displaceably supported and the shaft is supported in the bearing element in an axially coupled manner, so that a displacement of the bearing element in the axial direction causes a corresponding displacement of the shaft in the same axial direction.

4. The coffee grinder according to claim 2, wherein the bearing element comprises at least one bearing ring, and at least one of these bearing rings is displaceably supported and the shaft is supported in this bearing element in an axially coupled manner, so that a displacement of the bearing element in the axial direction causes a corresponding displacement of the shaft in the same axial direction.

5. The coffee grinder according to claim 3, wherein the adjusting pin is coupled to the bearing element, the adjusting pin being mounted in such a way that a rotation of the adjusting pin leads to a simultaneous axial displacement of the bearing element.

6. The coffee grinder according to claim 5, wherein the adjusting pin is mounted via a thread and engages with its tip in a guide in or on the bearing element and an axial displacement of the adjusting pin causes the axial displacement of the bearing element.

7. The coffee grinder according to claim 1, wherein the adjusting element is mechanically coupled to an adjustment element which is to be manually operated by a user, and the magnetic rotation position sensor:
is directly connected to the adjusting element, or
directly measures the rotational position of the adjusting element on a further component firmly connected to it, or
indirectly on a rotary element mechanically coupled to the adjusting element and different from the adjustment element for the user, the rotation of which rotary element is coupled to measure the rotation of the adjusting element and in turn performs a maximum rotation of less than 360° within the adjustment range.

8. The coffee grinder according to claim 1,
wherein the first grinding element is provided stationary, and
wherein the shaft is preloaded in a direction away from the second grinding element.

9. The coffee grinder according to claim 1,
wherein the adjusting pin is mechanically coupled to an adjustment element in the form of an adjustment ring to be manually operated by a user,
wherein the magnetic rotational position sensor directly on the adjusting pin or on a further component firmly connected thereto measures the rotational position of the adjusting element directly,
wherein a bipolar magnet is arranged on the axis of the adjusting pin with poles in the radial direction, and
wherein the rotational position sensor is arranged axially above the bipolar magnet.

10. The coffee grinder according to claim 1,
wherein the adjusting pin is mechanically coupled to an adjustment element in the form of an adjustment ring to be manually operated by a user, and
wherein the magnetic rotational position sensor is indirectly coupled to a magnetic rotational position sensor mechanically coupled to a rotary element, which is different from the adjustment element for the user and the rotation of which is coupled to the rotation of the adjusting element and in turn performs a maximum rotation of less than 360° within the adjustment range, measures the rotational position, and
wherein the ratios of the rotation of the rotary element to the rotation of the adjusting pin are in the range of 1.5:1-1:1.5.

11. The coffee grinder according to claim 10, wherein a toothed wheel is arranged on the adjusting pin, which toothed wheel is coupled via an external toothing to a transmission toothed wheel with external toothing.

12. The coffee grinder according to claim 10,
wherein the adjusting element comprises a toothed wheel is arranged on the adjusting pin, which toothed wheel is coupled via an external toothing to a transmission toothed wheel with external toothing,
wherein the toothed wheel and the transmission toothed wheel have substantially the same diameter, and the bipolar magnet is provided or embedded in the transmission toothed wheel on its axis or the transmission toothed wheel is provided via a further transmission stage, either a further gearwheel or a belt construction, is coupled to an additional rotary element, the rotation of which is thus also coupled to the rotation of the adjusting element and performs a maximum rotation of less than 360° within the adjustment range, and
wherein the bipolar magnet is provided or embedded in this additional rotary element on its axis.

13. The coffee grinder according to claim 1, wherein the coffee grinder additionally comprises a weighing cell for measuring the weight of the ground coffee effectively inserted in a filter holder.

14. The coffee grinder according to claim 1, wherein the coffee grinder additionally comprises a display, and the absolute rotational position is transmitted from the magnetic rotational position sensor to a central control, and this control correlates the absolute rotational position with the distance in the sense of the gap width between the grinding elements and prepares it for output on the display.

15. The coffee grinder according to claim 14, wherein the display shows the actual value of the rotational position or gap width and the target value required for the desired grinding degree, and/or an instruction to manually change an adjustment element to be manually operated by the user in a certain direction until the target value is reached.

16. The coffee grinder according to claim 14, wherein the display shows the actual value of the rotational position or gap width and the target value required for the desired grinding degree, and/or an instruction to manually change an adjustment element to be manually operated by the user in a certain direction until the target value is reached,
whereby optical and/or acoustic and/or mechanical feedback elements are additionally provided to indicate to the user whether the setpoint value has been reached.

17. The coffee grinder according to claim 1, wherein a drive is provided which, on the basis of the measurement of the absolute rotational position of the adjusting element, automatically brings the adjusting element in a controlled manner into the rotational position which corresponds to a degree of grinding selected and/or automatically determined by the user, if necessary in combination with measured values of an additionally provided weighing cell the weight measurement of the ground coffee.

18. A method of operating a coffee grinder according to claim 1,
wherein the coffee grinder has at least one display on which the actual value of the rotational position or the gap width and the desired value required for the desired grinding degree is shown, and/or an instruction to manually change an adjustment element to be manually operated by the user in a certain direction, until the target value is reached, and wherein this indication is changed while the user manipulates the adjustment element until the desired target value is reached.

19. The method of operating a coffee grinder according to claim 18,
wherein the indication is dynamically changed while the user manipulates the adjustment element until the desired target value is reached, and wherein optical and/or acoustic and/or mechanical feedback elements are provided which indicate to the user whether the target value is reached.

20. The coffee grinder according to claim 1,
wherein the first grinding element is in the form of a grinding ring or grinding cone and is provided in a stationary manner and the second grinding element is in the form of a grinding ring, grinding disc or grinding cone.

21. The coffee grinder according to claim 1,
wherein the movable structure is the motor.

22. The coffee grinder according to claim 1,
wherein the adjusting pin is mechanically coupled to an adjustment element, in the form of an adjustment ring, which is to be manually operated by the user, and
wherein the magnetic rotation position sensor is directly connected to the adjusting element or directly measures the rotational position of the adjusting element on a further component firmly connected to it, or indirectly on a rotary element mechanically coupled to the adjusting element and different from the adjustment element for the user, the rotation of which rotary element is coupled to the rotation of the adjusting element and in turn performs a maximum rotation of less than 360° within the adjustment range.

23. The coffee grinder according to claim 1,
wherein the first grinding element is in the form of a grinding ring, grinding disc or grinding cone and is provided stationary, on a fixed disc flange, and the second grinding element is in the form of a grinding ring, grinding disc or grinding cone, on a running disc flange, and is rotatably mounted, and rotates relative to the first grinding element during the grinding process, and
wherein the shaft is preloaded in a direction away from the second grinding element, with a spiral spring which is arranged on the side of the motor facing away from the second grinding element.

24. The coffee grinder according to claim 1,
wherein the adjusting pin is mechanically coupled to an adjustment element in the form of an adjustment ring to be manually operated by a user, and the magnetic rotational position sensor directly on the adjusting pin or on a further component firmly connected thereto measures the rotational position of the adjusting element directly,
wherein a bipolar magnet is arranged on the axis of the adjusting pin with poles in the radial direction, on the side facing away from the bearing element, and
wherein the rotational position sensor is arranged axially above the bipolar magnet.

25. The coffee grinder according to claim 1,
wherein the adjusting pin is mechanically coupled to an adjustment element in the form of an adjustment ring to be manually operated by the user, and the magnetic rotational position sensor is indirectly coupled to a magnetic rotational position sensor mechanically coupled to a rotary element, which is different from the adjustment element for the user and the rotation of which is coupled to the rotation of the adjusting element and in turn performs a maximum rotation of less than 360° within the adjustment range, measures the rotational position,
wherein the ratios of the rotation of the rotary element to the rotation of the adjusting pin are in the range of 1.1:1-1:1.1, or in the range of 1:1, and
wherein no more than two transmission stages are provided between the adjusting pin and the rotary element.

26. The coffee grinder according to claim 1, wherein the coffee grinder additionally comprises a weighing cell for measuring the weight of the ground coffee effectively inserted in a filter holder, said weighing cell being arranged in a foot of the coffee grinder arranged outside the housing.

* * * * *